No. 680,293. Patented Aug. 13, 1901.
D. H. TREICHLER.
ACETYLENE GAS GENERATOR.
(Application filed July 14, 1900.)
(No Model.) 3 Sheets—Sheet 1.

Witnesses: Henry D. Deck. F. F. Schuzinger.
Inventor: Daniel H. Treichler
By Wilhelm Bonner, Attorneys.

No. 680,293. Patented Aug. 13, 1901.
D. H. TREICHLER.
ACETYLENE GAS GENERATOR.
(Application filed July 14, 1900.)

(No Model.) 3 Sheets—Sheet 2.

Witnesses:
Henry L. Deck.
F. F. Scherzinger.

Daniel H. Treichler, Inventor
By Wilhelm Bonner
Attorneys

No. 680,293. Patented Aug. 13, 1901.
D. H. TREICHLER.
ACETYLENE GAS GENERATOR.
(Application filed July 14, 1900.)
(No Model.) 3 Sheets—Sheet 3.
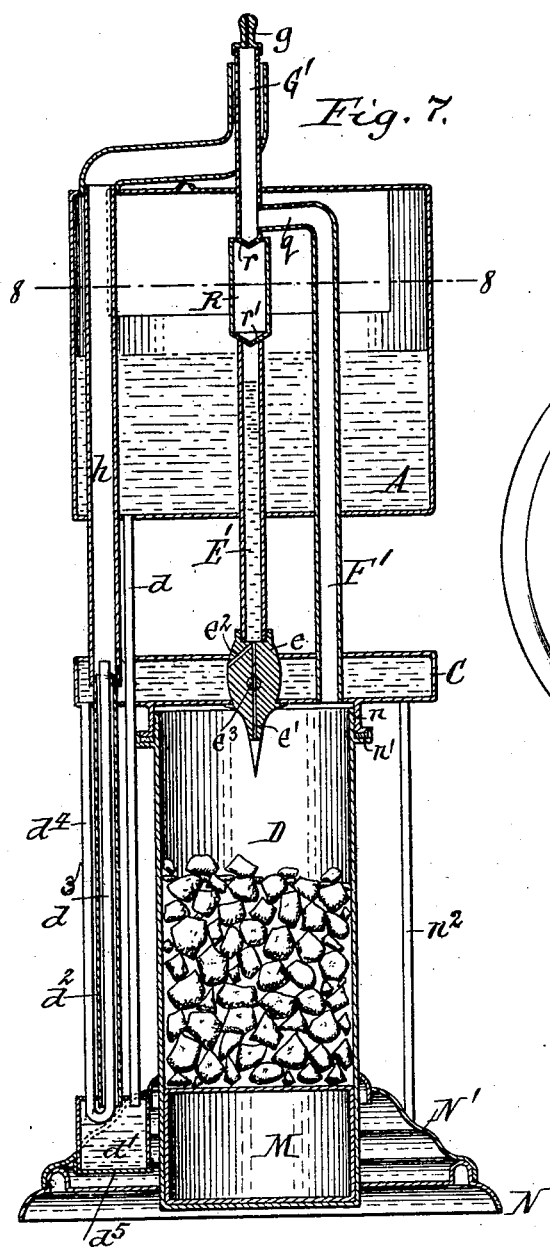
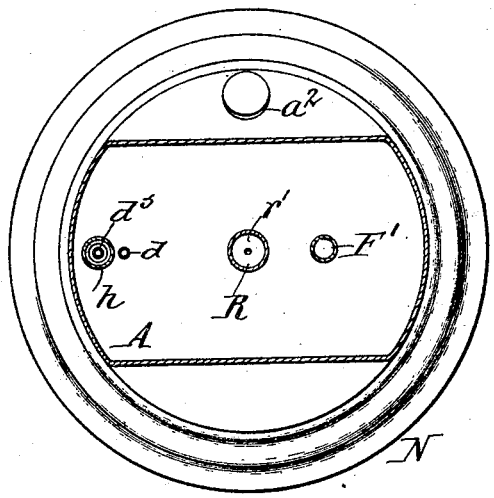
Witnesses:
Henry L. Deck.
F. F. Scherzinger.
Daniel H. Treichler, Inventor
By Wilhelm Bonner
Attorneys.

UNITED STATES PATENT OFFICE.

DANIEL H. TREICHLER, OF NIAGARA FALLS, NEW YORK.

ACETYLENE-GAS GENERATOR.

SPECIFICATION forming part of Letters Patent No. 680,293, dated August 13, 1901.

Application filed July 14, 1900. Serial No. 23,646. (No model.)

*To all whom it may concern:*

Be it known that I, DANIEL H. TREICHLER, a citizen of the United States, residing at Niagara Falls, in the county of Niagara and State of New York, have invented new and useful Improvements in Acetylene Generators, of which the following is a specification.

This invention relates to an acetylene-generator in which the gas is generated by delivering small quantities of water upon a charge of calcium carbid.

The objects of this invention are to improve the means whereby the generation of gas is controlled, to improve the means for purifying the gas, to provide simple means for regulating or equalizing the pressure of the gas, to provide means whereby small charges of carbid may be used more advantageously, and to improve the apparatus in other respects.

Figure 1:
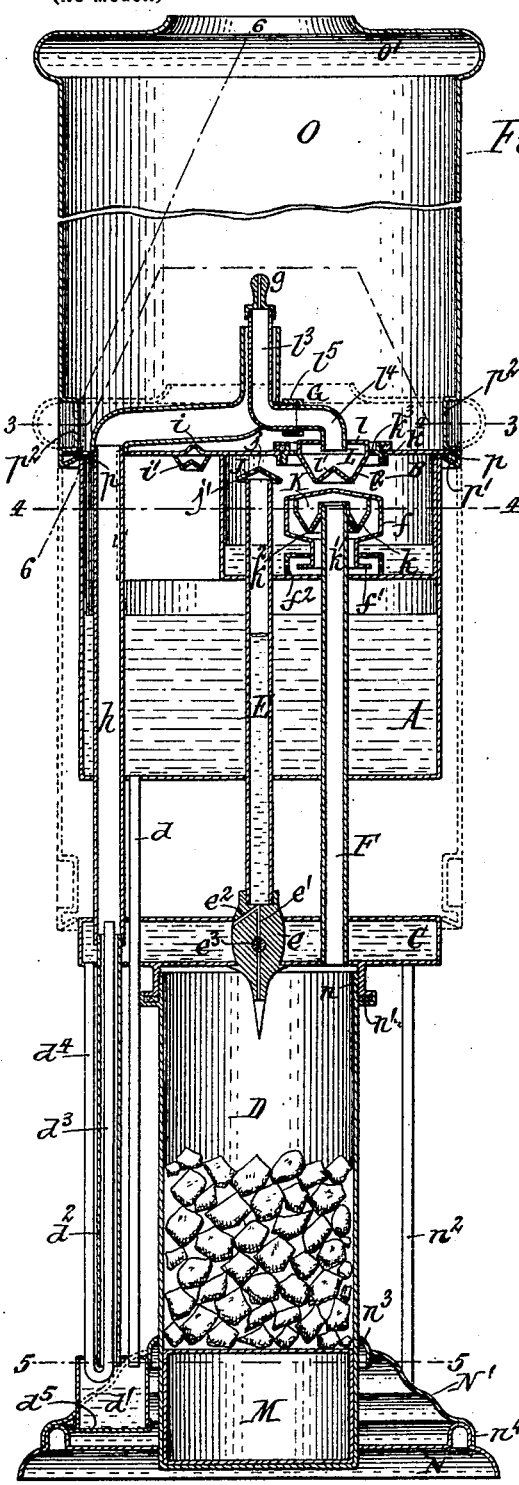
Figure 2:
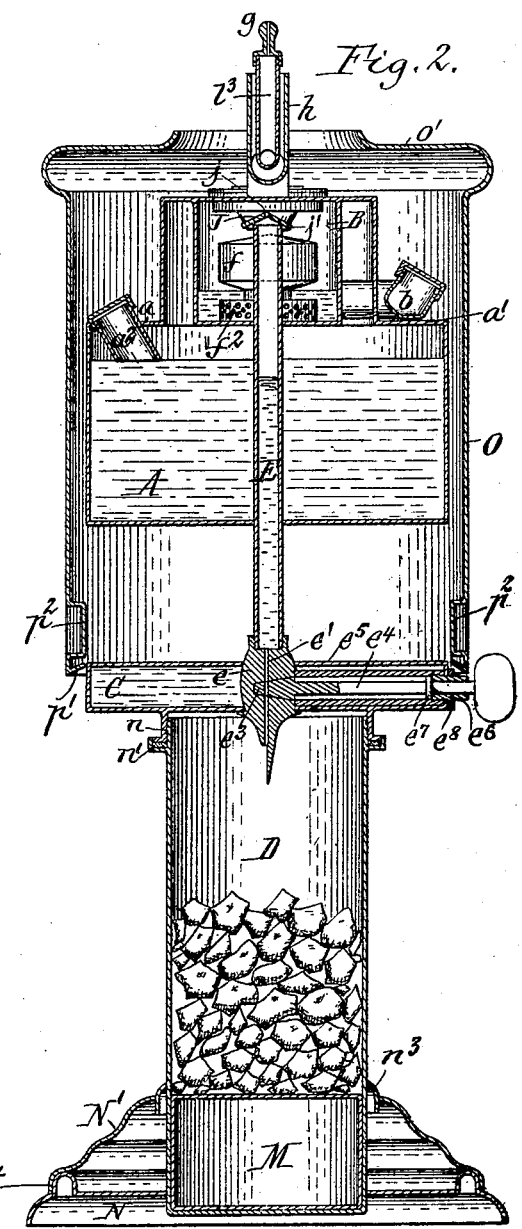
Figure 3:
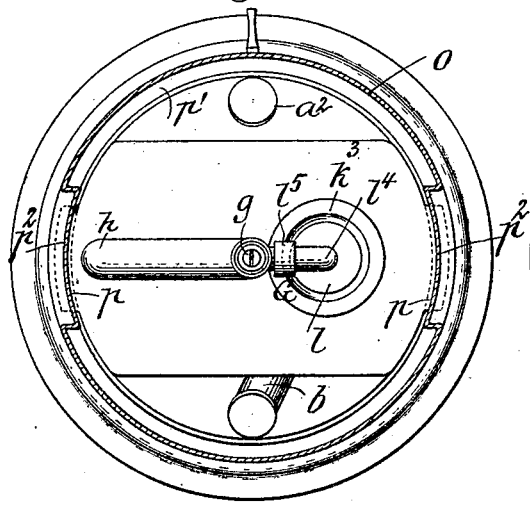
Figure 4:
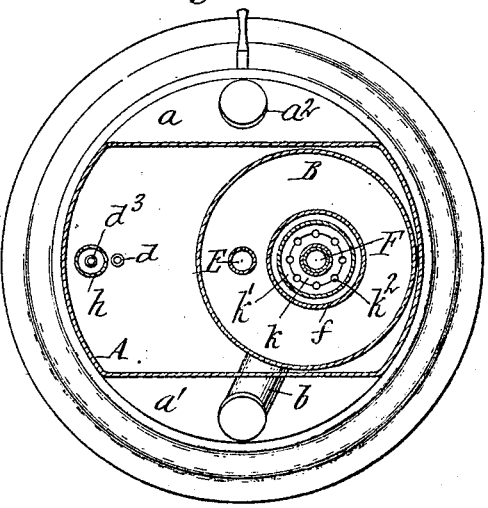
Figure 5:
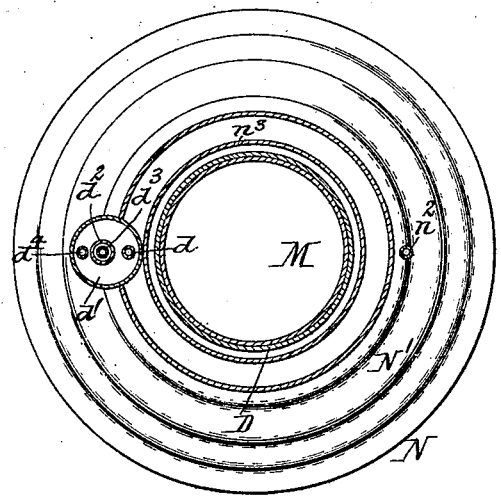
Figure 6:
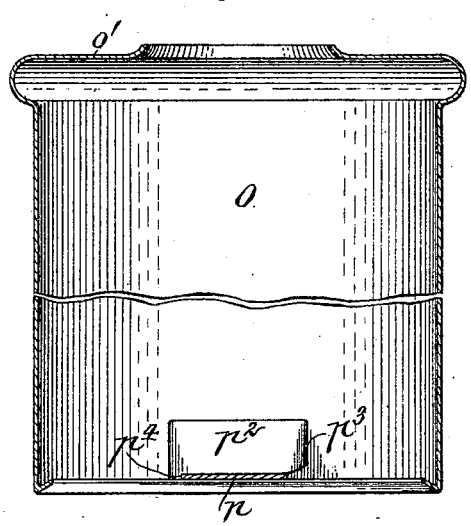

In the accompanying drawings, consisting of three sheets, Figure 1 is a vertical section of my improved acetylene-lamp, showing the darkening-hood raised into its operative position. Fig. 2 is a vertical section of the same at right angles to Fig. 1 and showing the darkening-hood in its lower inoperative position. Figs. 3, 4, and 5 are horizontal sections in lines 3 3, 4 4, and 5 5, Fig. 1, respectively. Fig. 6 is a fragmentary vertical section of the hood and connecting parts in line 6 6, Fig. 1. Fig. 7 is a vertical section of my improved acetylene-lamp, showing a construction in which the purifying-chamber is omitted. Fig. 8 is a horizontal section of the same in line 8 8, Fig. 7.

Like letters of reference refer to like parts in the several figures.

A represents the main water-chamber, which is preferably of cylindrical form and reduced on opposite sides of its upper end, so as to form horizontal shelves $a$ $a'$ on the main water-chamber. Water is supplied to the water-chamber through a filling-tube $a^2$, which extends downwardly into the water-chamber through the shelf $a$ and is normally closed by a screw-cap. It is necessary to leave a clear space in the top of the water-chamber in order to permit the water therein to rise and fall as the pressure of the gas varies. When filling the water-chamber through an ordinary opening in the top, it is difficult to determine when the water has reached the desired level. In order to enable the attendant to readily observe the height of the water when the same rises to the desired level, the filling-tube $a^2$ is extended downwardly into the water-chamber and terminates with its lower end at a point in line with the normal level to which the water-chamber should be filled with water. The attendant when filling the water-chamber can distinctly observe the water as it enters the lower end of the filling-tube and so determine when the water has reached the proper level.

B represents a purifying-chamber containing water or other purifying solution or liquid through which the gas is passed for purifying and cooling the same. This chamber is arranged in the upper contracted part of the water-chamber and is supplied with water through a filling-tube $b$, which is arranged above the shelf $a'$ and which is normally closed by a screw-cap, as shown in Figs. 2 and 4. It is necessary to leave a clear space in the purifying-chamber above the water therein to collect the gas which passes upwardly through the water in the chamber. In order to prevent the attendant from filling the purifying-chamber too high with water, the filling-tube $b$ opens with its outlet end into the lower part of the purifying-chamber and extends with its inlet end upwardly to a point in line with the normal level to which the purifying-chamber should be filled with water. By this means the attendant can readily observe when the purifying-chamber has been filled to the required height with water, and it also prevents the attendant from filling the same too high, because the excess water will overflow the filling-tube.

C represents an equalizing or regulating chamber which is arranged below the water-chamber and which serves to receive the surplus gas and equalize the pressure of the same.

D represents the carbid or generating chamber, which is arranged below the regulating-chamber and which receives the charge of calcium carbid forming part of the gas-producing material. The water from the water-chamber passes downwardly through a vertical pipe $d$, connected at its upper end with the bottom of the water-tank, thence into a sediment-chamber $d'$, connecting with the lower end of the pipe $d$, thence upwardly through a main pipe $d^2$, connected at its lower end with the sediment-chamber, thence downwardly through a vertical pipe $d^3$, which is arranged within the main pipe $d^2$ and communicates with the same at its upper end, thence upwardly into the equalizing-chamber through a pipe $d^4$, which connects at its lower end with the lower end of the pipe $d^3$ and at its upper end with the regulating-chamber, as shown in Fig. 1.

E represents a stand-pipe which extends through the water-chamber and into the purifying-chamber and which opens at its upper end above the water-level in the purifying-chamber.

$e$ represents the casing of a valve whereby the water is turned on or off from the generating-chamber. This casing is arranged centrally in the equalizing-chamber and is provided with a vertical delivery-passage $e'$, which connects the lower end of the stand-pipe with the generating-chamber, and a lateral regulating-passage $e^2$, which connects the lower end of the stand-pipe with the upper part of the equalizing-chamber. Normally the water passes from the equalizing-chamber upwardly through the lateral passage $e^2$ in the valve-casing and rises in the stand-pipe.

$e^3$ is the rotary plug of the valve, which is arranged in the vertical passage $e'$ and is provided with the usual transverse port, whereby upon turning the plug the vertical passage may be opened or closed. The plug of the valve is arranged on a horizontal valve-stem $e^4$, which extends laterally through a supporting-sleeve $e^5$ on the valve-casing and is held in place by a gland $e^6$, screwed into the sleeve and bearing against a collar or shoulder $e^7$ on the valve-stem, and a jam-nut $e^8$ on the gland bearing against the supporting-sleeve.

F represents an upright gas-delivery pipe, which extends with its lower end through the equalizing-chamber and opens into the upper end of the generating-chamber, while its upper part extends through the water-chamber and into the purifying-chamber and terminates at its open upper end above the water in the purifying-chamber. Upon turning the valve-plug $e^3$ so as to open the passage $e'$ of the valve-casing the water in the stand-pipe drops on the carbid in the generating-chamber, and the generation of gas takes place.

The gas passes from the generating-chamber upwardly through the gas-pipe F and into a dome $f$, which is arranged above the upper end of the gas-pipe. This dome is closed at the top and open at the bottom and has its lower open end submerged in the water of the purifying-chamber, as shown in Fig. 1. The gas passes downwardly through the dome and discharges from the lower end of the latter into the water of the purifying-chamber and then passes upwardly through the water into the upper part of the purifying-chamber. While the gas passes through the water any moisture, dust, dirt, or other impurities contained in the gas are removed or washed out of the same and the gas is also cooled, thereby improving the quality of the gas and avoiding the liability of clogging the pipes through which the same passes. The lower or discharge end of the dome is provided with an annular horizontal flange $f'$, which causes the gas as it issues from the bottom of the dome to be spread out over a considerable area, thereby subjecting the same to a more thorough washing action. The purifying action of the water upon the gas is still further increased by a perforated chamber or screen $f^2$, which incloses the lower end of the dome and fits against the dome above its spreading-flange and rests upon the bottom of the purifying-chamber. As the gas passes upwardly through the water in large bubbles it is intercepted by the screen and broken up into small bubbles, whereby every particle of gas is thoroughly subjected to the purifying action of the water. The upper part of the dome is comparatively large, while the lower part is contracted, as shown in Figs. 1 and 2. By this means the outlet for the gas at the lower end of the dome is reduced and brought close to the delivery-pipe F, whereby the danger of dashing much water into the upper end of the delivery-pipe is reduced when the lamp is upset. Another advantage resulting from the contraction of the lower end of the dome is that it reduces the surface area of the water or other liquid in the purifying-chamber which is exposed to the carbid through the gas-pipe, thereby reducing the liability of generating gas by the moisture or dampness which is afforded by the exposed liquid-surface in the purifying-chamber. Furthermore, by thus contracting the outlet of the dome this outlet is brought near the center of the dome, which location is above the water-line of the purifying-chamber when the lamp falls to one side, thereby reducing the possibility of water entering the carbid-chamber through the delivery-pipe F. The upper or enlarged part of the dome forms a trap which catches the water which may pass into the same from the purifying-chamber when the lamp falls on its side, and thus prevents the water from passing through the delivery-pipe into the carbid-chamber. The gas passes from the top of the purifying-chamber through a discharge or burner pipe G to a burner $g$, where it is consumed. Some of the gas passes from the upper end of the purifying-chamber into the top of the stand-pipe and presses downwardly against the column of water in the same. The height of the column of water in the stand-pipe varies and is governed by the pressure of the gas. When the normal generation of gas takes place and the gas is consumed or delivered as fast as the same is generated, water is present in the standpipe and passes from the latter through the valve and upon the carbid in the generating-chamber, whereby the generation of gas is maintained. If an abnormal quantity of gas is generated, the pressure of the accumulating gas causes the water in the standpipe to be pressed downwardly by the gas entering the top of the stand-pipe. If the production of an excessive amount of gas continues, the increasing pressure of the gas causes the column of water in the stand-pipe to be pressed downwardly until the level of the water is below the inlet of the passage $e'$ in the valve-casing, whereby the supply of water to the carbid-chamber is automatically cut off and the generation of gas ceases as soon as the water previously delivered to the carbid has been spent. The water which has been displaced from the stand-pipe by the downward pressure of the gas first passes through the lateral passage $e^2$ into the equalizing-chamber, thence downwardly through the pipe $d^4$, thence upwardly through the pipe $d^3$, thence downwardly through the pipe $d^2$ and into the sediment-chamber $d'$, and thence upwardly through the pipe $d$ into the water-chamber, in which the level of the water is raised correspondingly. As the surplus gas is consumed the pressure of the same is gradually reduced, which causes the water to gradually return from the water-chamber through the pipes $d$ $d^2$ $d^3$ $d^4$ and chambers $d'$ and C and enter the stand-pipe and carbid-chamber, and then the generation of gas is resumed.

If the generation of gas continues for a considerable time after the water has been automatically cut off by the downward pressure of the gas in the stand-pipe, the increasing pressure of the gas causes the same to enter the equalizing-chamber through the passage $e^2$ and displace the water in the same. This chamber is comparatively wide and shallow, so that a considerable amount of gas can take the place of the water in this chamber without materially varying the level or height of the water, thereby maintaining a practically-uniform pressure of the gas and causing the flame to burn uniformly. If an unusual amount of gas is generated by reason of an excess supply of water and the pressure of gas continues to rise after the water in the equalizing-chamber has been displaced by gas, this increasing pressure of the gas causes the same to follow the water downwardly through the pipe $d^4$, thence upwardly through the pipe $d^3$, and thence outwardly to the atmosphere by a vent-pipe $h$, which connects with the open upper end of the pipe $d^2$. The vent-pipe preferably extends upwardly through the water-chamber and terminates with its outlet end around the burner, as shown in Figs. 1, 2, and 3, whereby the gas escaping through the vent-pipe is ignited by the flame at the burner. It will thus be seen that the rise and fall in the pressure of gas causes the water to pass back and forth through two water seals or traps, which are arranged between the water-chamber and the equalizing-chamber and stand-pipe, while the gas resulting from an extraordinary pressure passes only through one water seal or trap before reaching the vent, whereby the other water seal or trap serves as a safety means to effectually prevent the passage of any gas to the water-chamber, where its accumulation is liable to produce disastrous results.

When it is desired to extinguish the flame, the valve is closed, thereby cutting off the supply of water from the stand-pipe to the carbid-chamber. By arranging the water-valve immediately at the place where the water is delivered to the carbid-chamber this valve when closed cuts the supply of water off positively and immediately from the carbid, so that the generation of gas is practically stopped at once and no water can enter the carbid-chamber if the lamp is shaken while handling the same.

By locating the valve $e^3$ in the branch passage $e'$ free communication is maintained at all times between the lower end of the water-column and the water-supply below the same. If the valve is turned off immediately after an excessive amount of water has been delivered to the carbid, the excessive amount of gas resulting therefrom causes the water to be pressed downwardly in the water-column and into the equalizing-chamber by reason of the free communication between the same, thereby preventing undue pressure of the gas at the burner and maintaining a uniform flame.

The size of the passage $e'$ is very small compared with the size of the water-column, this passage being just large enough to supply the maximum amount of water to the carbid. By thus restricting the size of the feed-passage $e'$ relative to the water-column it causes the water which is not carried to the carbid by the passage $e'$ to rise in the water-column. When the gas-pressure is high, the water-column is pressed from the top down, which causes the reduced weight or pressure of the water resulting from the reduced height of the water-column to flow less rapidly upon the carbid.

When the pressure or amount of gas is reduced by consumption, the water-column rises and the flow of water to the carbid increases by reason of the increased weight or pressure of the higher column of water, thereby increasing the generation of gas.

It will thus be seen that by restricting the water-passage $e'$, leading from the water-column to the carbid-chamber, an automatic regulation of the water-feed is obtained, which is as positive as a partial closing of the valve $e^3$ and is due to the rising of the water more or less in the column above the inlet of the feed-passage $e'$.

The liquid in the purifying-chamber in addition to purifying and cooling the gas which issues from the generating-chamber also serves as a liquid seal or column which aids in producing a fine regulation of the water-supply to the carbid. Inasmuch as the gas from the carbid-chamber is obliged to pass through the column of liquid in the purifying-chamber before it reaches the gas-space in the purifying-chamber, the pressure of the gas in the latter chamber is lower than that in the carbid-chamber. This causes the gas-pressure against the lower end of the liquid column in the stand-pipe to preponderate over the gas-pressure against the upper end of the liquid column in the stand-pipe. By this means the weight of the regulating liquid column in the stand-pipe is offset and the flow of liquid from the stand-pipe into the carbid-chamber is retarded notwithstanding that the liquid in the stand-pipe is above the feed-opening, thereby producing a very close regulation or governing of the liquid-supply to the carbid and still permitting the size of the feed opening or passage $e'$ to be made large enough to avoid clogging.

The sediment which is precipitated by the water in the sediment-chamber may be removed from the latter by detaching its bottom $d^5$, which is connected therewith by a screw-joint. By intercepting the sediment in the water before it reaches the stand-pipe the water in the latter is comparatively free from dirt, thereby reducing the tendency to clog the passage of the valve.

The air is discharged from and admitted to the water-chamber as the water rises and falls therein through an air-opening $i$, arranged in the top of the water-chamber. This air-opening is provided with a perforated cap $i'$, which fits over the inner end of the opening and which prevents the escape of any considerable quantity of water from the water-chamber when the lamp is upset or handled carelessly.

J represents an upwardly tapering or conical guard-cap which is secured to the upper end of the stand-pipe and which is provided at its apex with a small opening $j$ and projects with its edge $j'$ beyond the side of the stand-pipe. The opening $j$ is sufficiently large to permit the gas to pass freely into and out of the top of the stand-pipe as the pressure of the gas varies, but is so small that when the lamp is upset or handled carelessly no appreciable quantity of water can pass through this opening from the purifying-chamber into the stand-pipe. As the water dashes about in the purifying-chamber when handling the lamp carelessly the water strikes against the under side of the overhanging edge of the cap on the stand-pipe, whereby the breaking of the water over the top of the cap is checked. Any water that may dash or break over the top of the cap is shed by the inclined side of the cap when the lamp is righted. By this means the possibility of the impure water in the purifying-chamber entering the stand-pipe is reduced to a minimum, thereby preventing the impurities in this water from clogging the valve.

If no provision were made to check the passage of the water from the purifying-chamber into the upper end of the gas-delivery pipe F, this water would be liable to flood the carbid in the generating-chamber when the lamp is upset or handled carelessly, thereby causing a dangerous generation of gas. In order to prevent any considerable quantity of water from passing from the purifying-chamber into the generating-chamber, the upper end of the gas-pipe is provided with a trap-chamber, which is constructed as follows:

K represents a guard or trap chamber arranged between the top of the gas-pipe F and the dome $f$. This chamber is secured with the upper edge of its side wall to the dome and fits with its inner edge over the top of the gas-pipe. The bottom of the guard-chamber is formed by two reversely-inclined cones $k\ k'$, which are connected at their lower ends and form together an annular channel or trough around the upper end of the gas-pipe. The bottom of the channel or trough is provided with an annular row of small openings $k^2$, through which the gas passes downwardly from the gas-pipe into the water, but which prevent any considerable quantity of water passing from the dome into the gas-pipe and to the carbid-chamber. The inclined under side of the trough causes the water striking the same to be deflected away from the opening in the bottom of the trough. Any water that may pass into the trough, if the lamp remains upset for some time, is again drained by the inclined sides of the trough to the openings thereof and discharged into the purifying-chamber when the lamp is righted. The guard-chamber K is fitted loosely on top of the gas-pipe, and the screen $f^2$ rests loosely on the bottom of the purifying-chamber, so as to permit these parts, together with the dome, to be removed for cleaning the lamp or repairing the same. Access is afforded to the inside of the purifying-chamber through an opening in the top thereof, which opening is large enough for the passage of the dome and connecting parts and is normally closed by a plate $k^3$, which is connected with the top of the purifying-chamber by a packed screw-joint $k^4$, as shown in Figs. 1 and 3.

In order to prevent the escape of any considerable quantity of water into the burner-pipe G when the lamp is upset or handled carelessly, the lower or inlet end of the burner-pipe is inclosed by a guard or trap chamber L, having a top $l$, secured to the inlet end of the delivery-pipe, and a bottom, consisting of two reversely-inclined cones $l'\ l^2$, which form an annular trough. The bottom of this trough is provided with perforations, which permit the gas to pass from the purifying-chamber to the burner-pipe and which prevent the water of the purifying-chamber from escaping rapidly into the delivery-pipe if the lamp is upset. Any water that gets into the guard or trap chamber L is drained back into the purifying-chamber by the inclined sides of its conical bottom when the lamp is turned right side up. The upper guard-chamber L is preferably mounted on the cover-plate $k^3$, so as to be removable therewith. The burner-pipe is composed of an upper fixed section $l^3$ and a lower movable section $l^4$. These are connected by a union $l^5$, which permits the lower section to be removed, together with the upper guard-chamber L and cover-plate $k^3$, when access is desired to the interior of the purifying-chamber.

When a small charge of carbid was placed in the carbid-chamber of an acetylene-generator as hereinbefore constructed, sufficient gas would have to be generated to fill the vacant space in the carbid-chamber before the gas would reach the burner, which was objectionable, because the lamp was not ready for immediate use when the charge of carbid was placed in the generating or carbid chamber. In order to secure a prompt supply of gas at the burner when using a small charge of carbid, a hollow air-tight filling-piece M is placed in the bottom of the carbid-chamber. This filling-piece takes up the space which otherwise would be occupied by the balance of a full charge of carbid and causes the gas as soon as it is generated to pass immediately to the burner, so that the lamp is ready for use when charged. A number of these filling-pieces of different sizes may be provided, so as to permit of using varying charges of carbid.

The generating-chamber is detachably connected at its upper end with the under side of the equalizing-chamber by a screw-joint $n$, which is provided with a packing $n'$, whereby the generating-chamber may be removed for charging the same. As shown in the drawings, the vent-pipe $h$, trap-pipe $d$, stand-pipe E, and gas-pipe F serve as a supporting connection between the water-chamber and equalizing-chamber. The lamp is supported while in use by a main base N, which is arranged on the lower end of the generating-chamber and is removable therewith. In order to provide a support for the upper part of the lamp containing the water-supplying device and other parts while the generating-chamber and base are removed, a subbase N' is provided, which is arranged around the lower part of the generating-chamber and the main base when the parts are assembled and which is connected at one side with the lower ends of the pipes forming the double trap or seal. The opposite side of the subbase is preferably connected with the upper parts of the lamp by a brace or standard $n^2$. The generating-chamber is preferably provided with an annular flange $n^3$, whereby it bears against the upper inner side of the subbase, and the main base is provided with an annular shoulder $n^4$, whereby it bears against the lower inner side of the subbase, as shown in Figs. 1 and 2.

It has been found in practice that the generation of gas continues a short time after the water has been turned off from the generating-chamber by the valve, which causes the flame to burn until the supply of gas is consumed, and therefore prevents the flame from being extinguished at will. In order to permit of instantly darkening the room in which the flame continues to burn after the water is turned off, a darkening-hood O is provided, which can be moved so as to expose the flame or to conceal the flame from the side. When the lamp is in use, this hood is lowered around the water-chamber, so as to expose the burner above the hood, in which position the latter is supported by an internal flange $o'$ at the upper end of the hood bearing against the upper part of the lamp, as shown by dotted lines in Fig. 1 and in full lines in Fig. 2. When it is desired to conceal the flame, the hood is raised into the position shown in full lines in Fig. 1, whereby the burner is inclosed from the side and the flame is concealed. The hood is held in this position by two lugs $p\,p$, arranged on opposite sides of the upper part of the body or the water-chamber of the lamps and engaging between an internal annular flange $p'$ on the lower end of the hood and two locking-projections $p^2\,p^2$, arranged on the inner side of the hood, above the annular lower flange $p'$. The hood is raised while its projections $p^2\,p^2$ are arranged vertically out of line with the lugs $p\,p$ of the water-chamber until the latter are engaged by the lower flange $p'$ of the hood. The hood is then turned until its projections $p^2$ have been moved over the lugs of the water-chamber, which prevents the hood from descending while in this position. The entrance of the lugs on the water-chamber into the space between the lower flange and the locking-projections of the hood is facilitated by beveling or inclining the front end of each projection, as shown at $p^3$, Fig. 6, and the turning movement of the hood on the lug $p$ is arrested when the parts are properly engaged by a shoulder or stop $p^4$, arranged on the rear end of each projection $p^2$ and engaging against the adjacent side of the companion lug $p$ on the water-chamber, as shown in Fig. 6. The locking-projections on the hood are preferably formed by pressing the same out of the body of the hood. When the hood is lowered, its lower flange fits around the upper part of the equalizing-chamber, as shown in dotted lines in Fig. 1 and in full lines in Fig. 2, thereby holding the hood in place. This flange flares downwardly, so as to guide the hood upon the equalizing-chamber upon lowering the same. If desired, a globe or shade may be mounted on top of the hood, so as to shade the light when the hood is in its lowered position.

In the modified construction of my improved acetylene-lamp shown in Figs. 7 and 8 the purifying-chamber and the parts arranged therein are omitted. In this construction the gas-delivery pipe F' is connected at its upper end by an inclined section $g$ directly with the burner-pipe G', and the upper end of the stand-pipe E' is connected with the burner-pipe and gas-pipe by a trap-chamber R. This chamber is provided at its upper and lower ends with downwardly-sloping conical heads $r\ r'$, which are perforated at their lowest parts. The gas from the pipe F' passes downwardly through the chamber R and acts upon the top of the column of water in the stand-pipe E' for regulating the supply of water in the carbid-chamber.

The trap-chamber R is sufficiently large to hold all the water which is liable to pass into the same from the stand-pipe when the lamp is upset, ordinarily, and this water is again returned to the stand-pipe when the lamp is righted, whereby any water is prevented from entering the generating-chamber through the gas-pipe F' under these conditions. If the lamp remains upset for a considerable time before it is righted, the water from the stand-pipe first fills the trap-chamber R slowly through the perforation in the lower head thereof and then flows through the perforation in the upper head thereof into the burner and gas pipes. When the lamp is again righted, all the water in the trap-chamber, the burner-pipe, and in the upper part $q$ of the gas-pipe, which inclines toward the trap-chamber, is returned to the stand-pipe, and only the water in the gas-pipe reaches the carbid, thereby reducing the excess generation of gas after the lamp is upset to a minimum.

I claim as my invention—

1. The combination with a water-supply, a carbid-chamber, and a gas-delivery pipe connected with the carbid-chamber, of a stand-pipe communicating at its upper end with the gas-delivery pipe and at its lower end with said water-supply, a branch pipe or passage extending from the lower end of said stand-pipe to the carbid-chamber, and a valve arranged in said branch pipe or passage, whereby the feed of water may be positively cut off from the carbid-chamber but the stand-pipe is constantly in communication with the water-supply, thereby permitting the water in the stand-pipe to recede and accommodate any excess gas when the valve is turned off and preventing undue pressure at the burner, substantially as set forth.

2. The combination with a water-supply, a carbid-chamber, and a gas-delivery pipe connected with the carbid-chamber, of a stand-pipe communicating at its upper end with the gas-delivery pipe and at its lower end with said water-supply, a branch pipe connecting the lower end of the stand-pipe with the carbid-chamber and a valve arranged in the branch pipe, said branch pipe having its passage restricted or of smaller size than the size of the stand-pipe, whereby the water is caused to rise in the stand-pipe above the inlet of the branch pipe and vary in its height according to the pressure of the gas, thereby regulating the feed of water to the carbid and the generation of the gas, substantially as set forth.

3. The combination with a water-chamber, a carbid-chamber, and a gas-delivery pipe connected with the carbid-chamber, of a stand-pipe connected at its upper end with said delivery-pipe and at its lower end with the carbid-chamber, and a conduit connecting the lower end of the stand-pipe with the water-chamber and containing a double trap or water seal, substantially as set forth.

4. The combination with a water-chamber, a carbid-chamber, and a gas-delivery pipe connected with the carbid-chamber, of a stand-pipe connected at its upper end with said delivery-pipe and at its lower end with the carbid-chamber, a conduit connecting the lower end of the stand-pipe with the water-chamber and containing two water seals or traps, and a vent connected with said conduit between the two water seals or traps, substantially as set forth.

5. The combination with a water-chamber, a carbid-chamber, and a gas-delivery pipe connected with the carbid-chamber, of a stand-pipe connected at its upper end with said delivery-pipe and at its lower end with the carbid-chamber, a conduit connecting the lower end of the stand-pipe with the water-chamber and containing two water seals or traps, and a sediment-chamber arranged at the lower end of one of said water seals or traps, substantially as set forth.

6. The combination with a water-chamber, an equalizing-chamber arranged below the water-chamber, and a carbid-chamber arranged below the equalizing-chamber, of a gas-delivery pipe connected with the carbid-chamber, a stand-pipe connected at its upper end with said delivery-pipe and at its lower end with the carbid-chamber and with the equalizing-chamber, a conduit connecting the bottom of the equalizing-chamber with the bottom of the water-chamber and containing two water seals which are arranged below the equalizing-chamber, a sediment-chamber arranged at the lower end of one of said water seals, and a vent-pipe connected with said conduit between the upper end of one of the water seals and the upper end of the other water seal, substantially as set forth.

7. The combination with a water-chamber, a purifying-chamber, and a carbid-chamber, of a gas-delivery pipe connecting the carbid-chamber and purifying-chamber, a stand-pipe arranged with its upper end in the purifying-chamber and connected at its lower end with the carbid-chamber and with the bottom of the water-chamber, and an upwardly-tapering cap arranged on the upper end of the stand-pipe and provided with a perforation, substantially as set forth.

8. The combination with a water-chamber, a purifying-chamber and a carbid-chamber, of a gas-delivery pipe connecting the carbid-chamber and the purifying-chamber, a standpipe arranged with its upper end in the purifying-chamber and connected at its lower end with the carbid-chamber and with the bottom of the water-chamber, and an upwardly-tapering cap arranged on the upper end of the stand-pipe and provided with a perforation at the top and projecting with its edge beyond the side of the stand-pipe, substantially as set forth.

9. The combination with a water-chamber, and a carbid-chamber, of a stand-pipe connected at its lower end with the water-chamber and also with the carbid-chamber and adapted to contain a variable liquid column, a gas-pipe connected at its lower end with the carbid-chamber, and a liquid chamber or passage which connects the upper end of the gas-pipe with the upper end of the stand-pipe and which is adapted to contain a column of liquid through which the gas passes from the upper end of the gas-pipe to the upper end of the stand-pipe, substantially as set forth.

10. The combination with a water-chamber, a purifying-chamber, and a carbid-chamber, of a stand-pipe opening with its upper end into the purifying-chamber and connected at its lower end with the carbid-chamber and with the bottom of the water-chamber, a gas-delivery pipe connected at its lower end with the carbid-chamber and opening with its upper end in the purifying-chamber, and a dome arranged over the upper end of the gas-delivery pipe and having a closed top and an open lower end, substantially as set forth.

11. The combination with the water-chamber, the purifying-chamber, and the carbid-chamber, of a stand-pipe opening with its upper end into the purifying-chamber and connected at its lower end with the carbid-chamber and with the bottom of the water-chamber, a gas-delivery pipe connected at its lower end with the carbid-chamber and opening with its upper end in the purifying-chamber, and a dome arranged over the upper end of the gas-delivery pipe and having a closed top and a laterally-extending flange around the open lower end thereof, substantially as set forth.

12. The combination with a water-chamber, a purifying-chamber, and a carbid-chamber, of a stand-pipe opening into the purifying-chamber and connected with the carbid and water chambers, a gas-delivery pipe connected with the carbid-chamber and opening into the purifying-chamber, and a dome arranged in the purifying-chamber above the delivery-pipe and having an enlarged closed upper end and a contracted open lower end which is submerged in the water of the purifying-chamber, substantially as set forth.

13. The combination with a water-chamber, a purifying-chamber, and a carbid-chamber, of a stand-pipe opening with its upper end into the purifying-chamber and connected at its lower end with the carbid-chamber and with the bottom of the water-chamber, a gas-delivery pipe connected at its lower end with the carbid-chamber and opening with its upper end in the purifying-chamber, a dome arranged over the upper end of the gas-delivery pipe and having a closed top and an open lower end, and a screen inclosing the lower end of the dome, substantially as set forth.

14. The combination with a water-chamber, the purifying-chamber, and the carbid-chamber, of a stand-pipe opening with its upper end into the purifying-chamber and connected at its lower end with the carbid-chamber and with the bottom of the water-chamber, a gas-delivery pipe connected at its lower end with the carbid-chamber and opening with its upper end into the purifying-chamber, a dome arranged over the upper end of said delivery-pipe and having a closed top and an open bottom, and a trap-chamber arranged between the upper end of the delivery-pipe and the upper end of the dome and having its bottom composed of two reversely-inclined cones which form a trough and having perforations in the lowest part thereof, substantially as set forth.

15. The combination with the water-chamber, the purifying-chamber, and the carbid-chamber, of a stand-pipe opening with its upper end into the purifying-chamber and connected at its lower end with the carbid-chamber and with the bottom of the water-chamber, a gas-delivery pipe connected at its lower end with the carbid-chamber and opening with its upper end into the purifying-chamber, a dome arranged over the upper end of said delivery-pipe and having a closed top and an open bottom, a flange arranged around the lower end of the dome, a screen inclosing the lower end of the dome and its flange, and a trap-chamber arranged between the upper end of the delivery-pipe and the upper end of the dome and having its bottom composed of two reversely-inclined cones which form a trough and having perforations in the lowest part thereof, substantially as set forth.

16. The combination with a water-chamber, a purifying-chamber, and a carbid-chamber, of a stand-pipe opening with its upper end in the purifying-chamber and connected at its lower end with the carbid-chamber and with the bottom of the water-chamber, a gas-delivery pipe connected at its lower end with the carbid-chamber and opening at its upper end into the purifying-chamber, a removable dome arranged in the purifying-chamber over the upper end of the gas-delivery pipe, and a cover which closes an opening in the purifying-chamber, substantially as set forth.

17. The combination with a water-chamber, a purifying-chamber, and a carbid-chamber, of a stand-pipe opening with its upper end in the purifying-chamber and connected at its lower end with the carbid-chamber and with the bottom of the water-chamber, a gas-delivery pipe connected at its lower end with the carbid-chamber and opening at its upper end into the purifying-chamber, a burner-pipe opening into the top of the purifying-chamber, and a trap-chamber inclosing the inner end of the burner-pipe and having its bottom composed of two reversely-inclined cones forming a trough and having perforations in the lowermost part thereof, substantially as set forth.

18. The combination with a water-chamber, a purifying-chamber, and a carbid-chamber, of a stand-pipe opening with its upper end in the purifying-chamber and connected at its lower end with the carbid-chamber and with the bottom of the water-chamber, a gas-delivery pipe connected at its lower end with the carbid-chamber and opening at its upper end into the purifying-chamber, a burner-pipe consisting of a fixed section and a movable section which opens into the purifying-chamber, a union connecting the sections of the burner-pipe, a removable cover closing an opening in the purifying-chamber and carrying the movable section of the burner-pipe, substantially as set forth.

19. The combination with a carbid-chamber having a closed bottom, and a water-supply which is connected with the upper end of the carbid-chamber and whereby the water is delivered upon the top of the carbid in said chamber, of a removable filling-piece which is arranged in the lower part of the carbid-chamber and which occupies a part of the space in the carbid-chamber not occupied by the carbid, substantially as set forth.

20. The combination with the water-supplying devices of an acetylene-generator, of a carbid-chamber having a detachable connection at its upper end with the water-supplying devices and provided at its lower end with a main supporting-base, and a subbase arranged on the lower part of the water-supplying devices, substantially as set forth.

21. The combination with the water-supplying devices of an acetylene-generator, of a carbid-chamber having a detachable connection at its upper end with the water-supplying devices and provided at its lower end with a main supporting-base, and a subbase arranged on the lower part of the water-supplying devices and engaging with the carbid-chamber and its base, substantially as set forth.

Witness my hand this 30th day of June, 1900.

DANIEL H. TREICHLER.

Witnesses:
ISADOR GOODMAN,
GEO. STROOD.